US008904015B2

(12) United States Patent
Hopkins

(10) Patent No.: US 8,904,015 B2
(45) Date of Patent: Dec. 2, 2014

(54) METHOD FOR OPTIMALLY UTILIZING A PEER TO PEER NETWORK

(75) Inventor: Samuel P. Hopkins, Freedom, PA (US)

(73) Assignee: Tiversa IP, Inc., Pittsburgh, PA (US)

(*) Notice: Subject to any disclaimer, the term of this patent is extended or adjusted under 35 U.S.C. 154(b) by 0 days.

(21) Appl. No.: 13/429,949

(22) Filed: Mar. 26, 2012

(65) Prior Publication Data
US 2012/0185601 A1 Jul. 19, 2012

Related U.S. Application Data

(60) Continuation of application No. 12/899,053, filed on Oct. 6, 2010, which is a division of application No. 11/039,981, filed on Jan. 21, 2005, now Pat. No. 8,095,614, which is a continuation-in-part of application No. 10/764,111, filed on Jan. 23, 2004, now Pat. No. 7,761,569.

(51) Int. Cl.
| G06F 15/16 | (2006.01) |
| H04L 12/26 | (2006.01) |
| H04L 29/08 | (2006.01) |
| H04N 21/63 | (2011.01) |
| H04L 12/24 | (2006.01) |

(52) U.S. Cl.
CPC .......... *H04L 67/104* (2013.01); *H04L 12/2697* (2013.01); *H04L 67/1063* (2013.01); *H04L 67/145* (2013.01); *H04L 67/107* (2013.01); *Y10S 707/99956* (2013.01); *H04N 21/632* (2013.01); *H04L 12/241* (2013.01); *H04L 67/1093* (2013.01); *H04L 43/50* (2013.01)
USPC .................... 709/227; 707/999.205

(58) Field of Classification Search
USPC ............................................... 709/227–229
See application file for complete search history.

(56) References Cited

U.S. PATENT DOCUMENTS

| 111,604 A | 2/1871 | Bailey |
| 5,949,760 A | 9/1999 | Stevens et al. |

(Continued)

FOREIGN PATENT DOCUMENTS

| CA | 2595684 | 1/2013 |
| EP | 1107512 A1 | 6/2001 |

(Continued)

OTHER PUBLICATIONS

Zupeng, Li et al. "Research of peer-to-peer network architecture" Communication Technology Proceedings, 2003. ICCT 2003. International Conference on Apr. 9-11, 2003, Piscataway, NJ, IEEE, vol. 1, Apr. 9, 2003, pp. 312-315.

(Continued)

*Primary Examiner* — Shirley Zhang
(74) *Attorney, Agent, or Firm* — Cesari and McKenna, LLP

(57) ABSTRACT

In accordance with an embodiment of the invention, there is provided a method for splitting a load of monitoring a peer to peer network. The method has a first node in the peer to peer network receiving information reported by a second node in the peer to peer network, including information concerning which nodes are connected to the second node. The method further has the first node connecting to nodes different from the nodes that are connected to the second node using the received information. The method still further has the first node reporting information, including information concerning which nodes are connected to the first node, such that the second node also has access to the reported information, thereby splitting the load of monitoring the peer to peer network among the first and second nodes.

15 Claims, 5 Drawing Sheets

(56) References Cited

U.S. PATENT DOCUMENTS

| | | | |
|---|---|---|---|
| 5,987,011 A | 11/1999 | Toh | |
| 6,069,896 A | 5/2000 | Borgstahl et al. | |
| 6,205,146 B1 | 3/2001 | Rochberger et al. | |
| 6,611,196 B2 | 8/2003 | Mynatt et al. | |
| 6,668,289 B2 | 12/2003 | Cheng et al. | |
| 6,732,180 B1 | 5/2004 | Hale et al. | |
| 6,839,769 B2 | 1/2005 | Needham et al. | |
| 6,855,660 B2 | 2/2005 | Tsou et al. | |
| 6,918,113 B2 | 7/2005 | Patel et al. | |
| 6,950,821 B2 | 9/2005 | Faybishenko et al. | |
| 6,965,591 B1 | 11/2005 | Roy | |
| 6,983,320 B1 | 1/2006 | Thomas et al. | |
| 7,003,514 B2 | 2/2006 | Dutta et al. | |
| 7,010,534 B2 | 3/2006 | Kraft | |
| 7,027,994 B2 | 4/2006 | Verdi et al. | |
| 7,089,301 B1 | 8/2006 | Labio et al. | |
| 7,120,145 B2 | 10/2006 | Ohba et al. | |
| 7,177,295 B1 | 2/2007 | Sholander et al. | |
| 7,206,841 B2 | 4/2007 | Traversat et al. | |
| 7,308,445 B2 | 12/2007 | Bharat et al. | |
| 7,318,092 B2 | 1/2008 | Sutler | |
| 7,327,683 B2 | 2/2008 | Ogier et al. | |
| 7,418,455 B2 | 8/2008 | Fan et al. | |
| 7,574,523 B2 | 8/2009 | Traversat et al. | |
| 7,600,033 B2 | 10/2009 | Bauer et al. | |
| 7,703,040 B2 | 4/2010 | Cutrell et al. | |
| 8,060,619 B1 | 11/2011 | Saulpaugh et al. | |
| 8,095,614 B2 * | 1/2012 | Hopkins | 709/208 |
| 2001/0003191 A1 | 6/2001 | Kovacs et al. | |
| 2001/0045949 A1 | 11/2001 | Chithambaram et al. | |
| 2002/0044549 A1 | 4/2002 | Johansson et al. | |
| 2002/0059204 A1 | 5/2002 | Harris | |
| 2002/0065832 A1 | 5/2002 | Mack | |
| 2002/0069098 A1 | 6/2002 | Schmidt | |
| 2002/0073204 A1 | 6/2002 | Dutta et al. | |
| 2002/0087885 A1 | 7/2002 | Peled et al. | |
| 2002/0138471 A1 | 9/2002 | Dutta et al. | |
| 2002/0143989 A1 | 10/2002 | Huitema et al. | |
| 2002/0152262 A1 | 10/2002 | Arkin et al. | |
| 2002/0161844 A1 | 10/2002 | Overtoom | |
| 2002/0181395 A1 | 12/2002 | Foster et al. | |
| 2002/0184310 A1 | 12/2002 | Traversat et al. | |
| 2003/0005035 A1 | 1/2003 | Rodgers | |
| 2003/0037167 A1 | 2/2003 | Garcia-Luna-Aceves et al. | |
| 2003/0050966 A1 | 3/2003 | Dutta et al. | |
| 2003/0050980 A1 | 3/2003 | Dutta et al. | |
| 2003/0055892 A1 | 3/2003 | Huitema et al. | |
| 2003/0067912 A1 | 4/2003 | Mead et al. | |
| 2003/0078889 A1 | 4/2003 | Lee et al. | |
| 2003/0088544 A1 | 5/2003 | Kan et al. | |
| 2003/0095660 A1 | 5/2003 | Lee et al. | |
| 2003/0112823 A1 | 6/2003 | Collins et al. | |
| 2003/0135495 A1 | 7/2003 | Vagnozzi | |
| 2003/0179742 A1 | 9/2003 | Ogier et al. | |
| 2003/0182428 A1 | 9/2003 | Li et al. | |
| 2003/0191828 A1 * | 10/2003 | Ramanathan et al. | 709/221 |
| 2003/0195852 A1 | 10/2003 | Campbell et al. | |
| 2003/0202468 A1 | 10/2003 | Cain et al. | |
| 2003/0208621 A1 | 11/2003 | Bowman | |
| 2004/0030651 A1 | 2/2004 | Kim et al. | |
| 2004/0039921 A1 | 2/2004 | Chuang | |
| 2004/0044790 A1 | 3/2004 | Loach et al. | |
| 2004/0044996 A1 | 3/2004 | Atallah | |
| 2004/0098370 A1 | 5/2004 | Garland et al. | |
| 2004/0111604 A1 | 6/2004 | Fournier | |
| 2004/0122958 A1 | 6/2004 | Wardrop | |
| 2004/0143842 A1 | 7/2004 | Joshi | |
| 2004/0148275 A1 | 7/2004 | Achlioptas | |
| 2004/0148434 A1 | 7/2004 | Matsubara et al. | |
| 2004/0153658 A1 | 8/2004 | Gunyakti et al. | |
| 2004/0157641 A1 | 8/2004 | Chithambaram et al. | |
| 2004/0158630 A1 | 8/2004 | Chang et al. | |
| 2004/0162871 A1 | 8/2004 | Pabla et al. | |
| 2004/0196784 A1 | 10/2004 | Larsson et al. | |
| 2004/0218532 A1 | 11/2004 | Khirman | |
| 2004/0230572 A1 | 11/2004 | Omoigui | |
| 2004/0236945 A1 | 11/2004 | Risan et al. | |
| 2004/0250106 A1 | 12/2004 | Annese et al. | |
| 2004/0250122 A1 | 12/2004 | Newton | |
| 2004/0260801 A1 | 12/2004 | Li | |
| 2005/0038898 A1 | 2/2005 | Mittig et al. | |
| 2005/0043548 A1 | 2/2005 | Cates | |
| 2005/0080858 A1 | 4/2005 | Pessach | |
| 2005/0086288 A1 * | 4/2005 | Datta et al. | 709/201 |
| 2005/0091167 A1 | 4/2005 | Moore et al. | |
| 2005/0091397 A1 | 4/2005 | Roberts et al. | |
| 2005/0108203 A1 | 5/2005 | Tang et al. | |
| 2005/0108248 A1 | 5/2005 | Natunen | |
| 2005/0114709 A1 | 5/2005 | Moore | |
| 2005/0144288 A1 | 6/2005 | Liao | |
| 2005/0157659 A1 | 7/2005 | Huitema | |
| 2005/0163050 A1 | 7/2005 | Hopkins | |
| 2005/0163133 A1 | 7/2005 | Hopkins | |
| 2005/0163135 A1 | 7/2005 | Hopkins | |
| 2005/0187942 A1 | 8/2005 | Dutta et al. | |
| 2005/0203851 A1 | 9/2005 | King et al. | |
| 2005/0229243 A1 | 10/2005 | Svendsen et al. | |
| 2005/0229255 A1 | 10/2005 | Gula et al. | |
| 2005/0265259 A1 | 12/2005 | Thubert et al. | |
| 2005/0267945 A1 | 12/2005 | Cohen et al. | |
| 2006/0020814 A1 | 1/2006 | Lieblich et al. | |
| 2006/0034177 A1 | 2/2006 | Schrempp | |
| 2006/0248062 A1 | 11/2006 | Libes et al. | |
| 2009/0024618 A1 | 1/2009 | Fan et al. | |
| 2011/0066695 A1 * | 3/2011 | Hopkins | 709/208 |
| 2012/0185536 A1 | 7/2012 | Hopkins | |
| 2012/0185601 A1 | 7/2012 | Hopkins | |

FOREIGN PATENT DOCUMENTS

| | | |
|---|---|---|
| WO | WO 03/009524 A | 1/2003 |
| WO | WO 2003/009524 | 1/2003 |
| WO | WO 2005/074229 A1 | 8/2005 |
| WO | WO 2005/074230 A2 | 8/2005 |
| WO | WO2006/110823 A3 | 10/2006 |
| WO | WO2008/057509 A3 | 5/2008 |
| WO | WO2008/127608 A3 | 10/2008 |

OTHER PUBLICATIONS

Marmor M. S. "Make the P2P Leap with Toadnode" Web Technologies, Miller Freeman, US vol. 5, No. 12, Dec. 2000, pp. 44-49.

Ueda K et al, "Peer-to-peer network topology control within a mobile ad-hoc nework" Communications, 2003. APCC 2003, The 9$^{th}$ Asia-Pacific Conference on Sep. 21-24, 2003, Piscataway, NJ IEEE, vol. 1, Sep. 21, 2003, pp. 243-247.

Liu J et al, "distributed distance measurement for large-scale networks" Computer Neetworks, Elsevier Science publishers B.V. Amsterdam, NL, vol. 41, No. 2, Feb. 5, 2003, pp. 177-192.

Anirban Mondal et al. "Effective load-balancing of peer-to-peer systems" Online, Mar. 2003.

Starr Anderson, Vincent Abella, "Changes to Functionality in Microsoft Windows XP Service Pack 2 part 2: Network Protection Technologies" Online, Sep. 15, 2004, pp. 1-56.

Markatos E P, "Tracing a large-scale peer to peer system: an hour in the life of Gnutella" Cluster Computing and the Grid 2$^{nd}$ IEEE/ACM International Symposium CCGRID2C02 Berlin, Germany May 21-24, 2002, Piscataway, NJ, IEEE Coput. Soc. US, May 21, 2002, pp. 65-74.

Hessing, Steven, "Peer to Peer Messaging Protocol," Internet-Draft, Apr. 2002, 55 pages.

Lindemann, C., et al., "A Distributed Search Service for Peer-to-Peer File Sharing in Mobile Applications," Peer-to-Peer Computing, 2002, Proceedings of the Second International Conference on Peer-to-Peer Computing, Sep. 5-7, 2002.

Mondal, A., et al., "Effective load-balancing of peer-to-peer systems,", Proceedings of Data Engineering Workshop (IEICE DEWS) DBSJ Annual Conference, Kaga city, Ishikawa, Japan, Mar. 2003. XP002299388.

Oram, A., "Peer-to-Peer: Harnessing the Power of Disruptive Technologies," Ch.10 Interoperability Through Gateways, Mar. 2001, p. 381-392.

(56) References Cited

OTHER PUBLICATIONS

Shi, W., et al., "Tuxedo: A Peer-to-Peer Caching System,", Department of Computer Science, Wayne University, Proceedings of 2003 International Conference on Parallel and Distributed Processing Techniques and Applications (PDPTA'03), Jun. 23-26, 2003.

Zhenyun Zhuang, et al. "Hybrid Periodical Flooding in Unstructured Peer-to-Peer Networks," Proceedings of the 2003 International Conference on Parallel Proceeding. pp. 272-280, Nov. 11, 2001.

Hwang, J., and Aravamudham, P., "Proxy-Based Middleware Services for Peer-to-Peer Computing in Virtually Clustered Wireless Grid Networks," School of Information Studies, Syracuse University, Proceedings of the International Conference on Computer, Communication and Control Technologies (ICCCT 03), Orlando, Florida, Jul. 2003.

International Search Report and Written Opinion of the ISA mailed May 14, 2008 in connection with PCT Application No. PCT/US07/23321.

International Search Report and Written Opinion of the ISA mailed Feb. 26, 2009 in connection with PCT Application No. PCT/US08/004614.

International Search Report and Written Opinion of the ISA mailed Sep. 12, 2007 in connection with PCT Application No. PCT/US06/13666.

United States General Accounting Office, Report to the Chairman and Ranking Minority Member, Committee on Government Reform, House of Representatives, "File Sharing Programs- Peer-To-Peer Networks Provide Ready Accessto Child Pornography," Feb. 2003, pp. 1-32.

Andersen, S., et al., Changes to Functionality in Microsoft Windows XP Service Pack 2 Part 2: Network Protection Technologies, Online, Sep. 15, 2004, pp. 1-56, XP002330123.

Brandon Wiley, Freenet, "Inoperability Through Gateways," Chapter 19, pp. 381-392, Mar. 2001.

Findeli, M., "Peer-to-Peer (P2P) Networkgin," On Line, Jul. 1, 2001, pp. 1-21.

Goel, S., et al., "A Resilient Network That Can Operate Under Duress: to Support Communication Between Government Agencies during Crisis Situations," IEEE, Proceedings of the 37th Annual Hawaii International Conference pp. 1-11, Jan. 2004.

Kim, K., and Park, D., "Subway: Peer-to-Peer Clustering of Clients for Web Proxy," Department of Electrical Engineering and Computer Science, Proceedings of the International Conference on Parallel and Distributed Processing Techniques and Applications, v.4, no., pp. 1683-1688, Jun. 23, 2003 [Retrieved on Sep. 25, 2007 from Internet URL:http://66.102.1.104/scholar?h1=en&lr=&q=cache:Cljbt8-S9ckJ:ideal.cecs.missouri.edu/IMC/papers/377PD.

Liu, Jiangchuan, et al., "Distributed Distance Measurement for Large-Scale Networks," Computer Networks 41(2), Feb. 5, 2003, pp. 177-192.

Marmor, Michael S., "Make the P2P Leap with Toadnode," www.webtechniques.com, Web Techniques, Miller Freeman US, vol. 5, No. 12, Dec. 1, 2000 (Dec. 1, 2000), pp. 44-49, XP008000376, ISSN: 1086-556X.

Markatos, E.P., Tracing a large-scale peer to peer system: an hour in the life of Gnutella, Cluster Computing and the Grid 2nd IEEE/ACM International Symposium CCGRID, 2002 Berlin, Germany, May 21-24, 2002, IEEE Comput. Soc., US, pp. 65-74.

Scarlata, V., et al., "Responder Anonymity and Anonymous Peer-to-Peer File Sharing," Proceedings of the International Conference on Network Protocols, Nov. 11, 2001, pp. 272-280.

Siu Man Lui, et al., "Interoperability of Peer-To-Peer File Sharing," ACM SIGecom Exchanges, vol. 3, No. 3, Aug. 2002, pp. 25-33.

*Tiversa, Inc., et al v. Cohen & Grigsby, P.C.*, Civil Division, Case No. GD 07/001515, Court of Common Pleas of Allegheny County, Pennsylvania, "Complaint," 89 pages, dated Sep. 5, 2007.

*Tiversa, Inc., et al v. Cohen & Grigsby, P.C.*, Court of Common Pleas of Allegheny County, Pennsylvania, "Preliminary Objections and Brief in Support of Preliminary Objections," 18 pages, dated Oct. 15, 2007.

*Tiversa, Inc., et al v. Cohen & Grigsby, P.C.*, Court of Common Pleas of Allegheny County, Pennsylvania, "First Amended Complaint," 90 pages, dated Nov. 5, 2007.

*Tiversa, Inc., et al v. Cohen & Grigsby, P.C.*, Civil Division, Case No. GD 07/001515, Court of Common Pleas of Allegheny County, Pennsylvania, "Defendant's Preliminary Objections to First Amended Complaint and Brief in Support," 14 pages, dated Nov. 21, 2007.

*Tiversa, Inc., et al v. Cohen & Grigsby, P.C.*, Civil Division, Case No. GD 07/001515, Court of Common Pleas of Allegheny County, Pennsylvania, "Court Order re: Defendant's Preliminary Objections to First Amended Complaint and Brief in Support," 14 pages, dated Nov. 27, 2007.

*Tiversa, Inc., et al v. Cohen & Grigsby, P.C.*, Civil Division, Case No. GD 07/001515, Court of Common Pleas of Allegheny County, Pennsylvania, "Second Amended Complaint," 89 pages, dated Dec. 11, 2007.

*Tiversa, Inc., et al v. Cohen & Grigsby, P.C.*, Civil Division, Case No. GD 07/001515, Court of Common Pleas of Allegheny County, Pennsylvania, "Answer to Second Amended Complaint," 29 pages, dated Jan. 30, 2008.

*Tiversa, Inc., et al v. Cohen & Grigsby, P.C.*, Civil Division, Case No. GD 07/001515, Court of Common Pleas of Allegheny County, Pennsylvania, "Reply to New Matter," 16 pages, dated Feb. 19, 2008.

Ueda, et al., "Peer-to-Peer Network Topology Control within a Mobile Ad-hoc Network," IEEE $9^{th}$ Asia-Pacific Conference on Communications, Sep. 21-24, 2003, pp. 243-247.

Xiao, et al., "Mutual Anonymity Protocols for Hybrid Peer-to-Peer Systems," Proceedings of the 23rd International Conference on Distributed Computing Systems, vol. 1., May 19-22, 2003.

Zupeng, et al., "Research of Peer-to-Peer Network Architecture," Proceedings of the International Conference on Communications Technology (ICCT 2003) vol. 1., Apr. 9-11, 2003, pp. 312-315.

Mondal, A. et al., "Effective load-balancing of peer-to-peer systems," Online, Mar. 2002, XP002299388.

Kim, K., and Park, D., "Subway: Peer-to-Peer Clustering of Clients for Web Proxy," Department of Electrical Engineering and Computer Science, [on line, Retrieved on Sep. 25, 2007]. Retrieved from the Internet URL:http://66.102.1.104/scholar?hl=en&q=cache:Cljbt8-S9ckJ:ideal.cecs.missouri.edu/IMC/papers/377PD.

Liu, Jiangchuan, et al., "Distributed Distance Measurement for Large-Scale Networks," Computer Networks 41 (2003) pp. 177-192.

Marmor, Michael S., "Make the P2P Lead with Toadnode," www.webtecniques.com, Dec. 2000, pp. 44-49.

Ueda, et al., "Peer-to-Peer Network Topology Control within a Mobile Ad-hoc Network," 2003 IEEE, pp. 243-247.

Xiao, et al., "Mutual Anonymity Protocols for Hybrid Peer-to-Peer Systems," Proceedings of the 23rd International Conference on Distributed Computing Systems, May 19-22, 2003.

Zupeng, et al., "Research of Peer-to-Peer Network Architecture," Proceedings of ICCT2003, pp. 312-315.

* cited by examiner

METHOD FOR OPTIMALLY UTILIZING A PEER TO PEER NETWORK

RELATED APPLICATIONS

This application is a continuation of U.S. application Ser. No. 12/899,053, filed Oct. 6, 2010, which is a divisional of U.S. application Ser. No. 11/039,981, filed Jan. 21, 2005 now U.S. Pat. No. 8,095,614, which is a continuation-in-part of U.S. application Ser. No. 10/764,111, filed Jan. 23, 2004 now U.S. Pat. No. 7,761,569.

The entire teachings of the above applications are incorporated herein by reference.

FIELD OF THE INVENTION

The present invention provides a method for optimally utilizing peer to peer networks, and, in particular, to optimally utilize peer to peer networks to increase the amount of communications messages received.

BACKGROUND OF THE INVENTION

As used herein, peer to peer networks which are the subject of the present invention comprise multiple nodes, each node typically consisting both of file server and client which can send and receive communication messages or information to or from a node to which such is connected.

In a peer to peer network each node is connected to other nodes over a communication medium such as the internet either directly or through some type of proxy. For example, when a search request is issued such originating node sends a search request to all of the nodes to which it is connected (see FIG. 1) These nodes search their list of available files and if a match is found they send a response back with the location. However, a peer to peer proxy network typically consists of node A which is connected to a node B and node B is connected to a node C. (see FIG. 2) Node A is not connected to node C such that if node A issues a search request it will be forwarded to node B and Node B will search its available files and if a match is found it will send a response back to node A. Node B will then forward node As request to node C and Node C will search its available files and if a match is found it will send a response back to node B. Node B will then forward this response to Node A. FIG. 3 discloses a nonproxy loop network wherein each node is directly connected to another.

Some peer to peer networks utilize a leaf node/main node proxy topology (See FIG. 4) where some nodes are classified as main nodes and the remaining nodes are classified as leaf nodes. Leaf nodes can only connect to main nodes. Only main nodes can connect to other main nodes. When a leaf node issues a search request it sends the request to the main node that it is connected to. The main node then forwards the request to any other leaf nodes that are connected to it and also to any main nodes it is connected to. These main nodes forward the request to any leaf nodes that are connected to them.

Accordingly it is an object of the present invention to provide a method for optimally utilizing a peer to peer network. It is yet another object of the invention to provide a method for reducing the number of connections required from a single node on a peer to peer network to view most, if not all, communication messages. It is yet another object of the invention to provide a method for optimally connecting to the network. It is yet another object of the invention to provide a method for locating nodes specific distances away from a first node.

SUMMARY OF THE INVENTION

Generally, the present invention provides a method for optimally utilizing a peer to peer network by controlling how a node connects into the network and by controlling how a node locates optimal nodes as well as by how the node interacts with the network and other nodes.

In one embodiment a first node issues a search for preselected information to help locate other nodes by watching responses. In another embodiment a first node issues a ping and compares the hops value to a predefined optimal value. In yet another embodiment a first node maintains connection statistics and compares these to a configured optimal value. In yet another embodiment a first node continuously clears its host cache at predetermined times.

In all of the embodiments, a node is configured to have one or more of the features set forth below. These features are employed in the invention to optimally utilize a peer to peer network as compared to the other network nodes on the particular network being addressed not so optimized. Thus, not all of the capabilities need to be programmed into each node in order to optimally utilize the network. The presently preferred methods of the present invention include:

configuring a node to send pings and review the distance parameters contained in the results.

configuring a node to send preconfigured searches and review the distance parameters contained in the results.

configuring a node to clear or modify its host cache based on a comparison of its host cache size.

configuring a node to clear or modify its host cache based on comparison of how long its host cache has existed.

configuring a node to throttle its connection attempts.

configuring a node to drop connections based on calculations of duplicate communication messages received.

configuring a node to drop connections based on the last time a transmission was received from a connection.

configuring a node to drop connections based on how well the connection is performing when compared to other connections.

configuring a node to connect to other similar nodes or a master node and share processing of the network.

Other advantages of the present invention will become apparent from a perusal of the following detailed description of presently preferred embodiments of the invention taken in connection with the accompanying drawings.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

Figure 1:
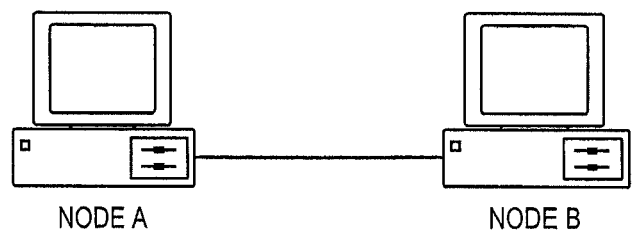
FIG. 1 is a simplified schematic of a two node peer to peer network.

A description of example embodiments of the invention follows.

Generally, peer to peer networks are quite large, often a million or more nodes. To reduce the bandwidth required to operate such networks, nodes have a community imposed transmission distance limitation. Most communication messages contain communication radius parameters such as hops. Hops is a value that normally starts at 0 and increments each time the communications is forwarded. When hops reaches a preset limit, often 5, the communications is dropped from the network. This effectively enforces a community "time to live" value and limits the number of nodes that would receive the communications from a particular transmitting node. It therefore would be optimal and advantageous to connect in such a way that a node would be within reach of all communication messages.

In one embodiment of the invention a first node wishing to be optimally connected to a second node issues a search request containing a preconfigured search term. This search term can be any term but preferably one that will match many files on other nodes. As other nodes available through the second node respond to the first node, the first node looks at the hops value of their responses and compares it to a value which value can be preconfigured by the operator. Such value can be generated by a mathematical calculation based on other values, or it can be in relation to other values. If the hop value is equal or greater than the compared value, the first node will attempt to connect to the node sending the response. If the hop value is less than the compared value the first node will not attempt to connect to the node sending the response. This method allows the first node to connect to node that are N hops away from currently connected nodes and expands its communications radius.

In another embodiment, the first node connects to a second node and issues a ping rather than a second request. As other nodes available through the second node respond to the first node, the first node looks at the hops value of their responses and compares it to a value which can be preconfigured by the operator. Such value can be generated by a mathematical calculation based on other values, or it can be in relation to other values as in the first embodiment. If the hop value is more or greater than the compared value, the first node will attempt to connect to the node sending the response. If the hop value is less than the compared value the first node will not attempt to connect to the node sending the response. This method allows the first node to connect to node that are N hops away from currently connected nodes and expands its communications radius.

In another embodiment a first node seeking to locate other nodes on the network for connection purposes issues a search request containing a preconfigured search term. This search term can be any term but preferably one that will match many files on other nodes. As other nodes available through the second node respond to the first node, the first node attempts to connect to them or adds them to a cache to be connected to later.

Figure 3:
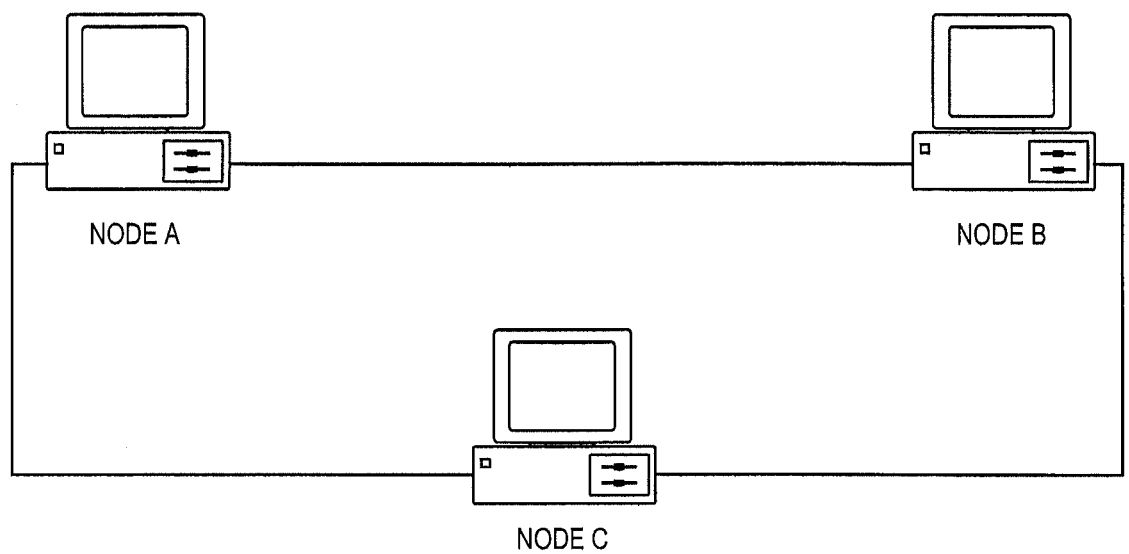
FIG. 3 is a simplified schematic view of a peer to peer, nonproxy, loop network.

Referring to FIG. 3, it is possible for a first node to be connected to other nodes which are within non-optimal distances from each other and these other nodes themselves having a second path to the first node. Other non-optimal connections are possible but the result of that is the first node would receive duplicate communications messages. It would benefit the first node if it could detect this situation, thus, in another embodiment of the invention, the first node maintains a count of duplicate communication messages which are received from each node. At intervals the first node will use the amount of duplicate communication messages in a preconfigured equation such as a comparison to a value, which value can be preconfigured by the operator, a value generated by a mathematical calculation based on other values or it can be in relation to other values. The comparison can be any comparison, for instance greater or less than or an average of. If using the equation, the node detects the connection is not optimal or meeting a certain criteria the first node will disconnect that connection.

It is possible for a first node to connect to a second node which is not connected to any other nodes or the second node may be configured to not forward any communications. In this situation the second node would be deemed unproductive. Thus, in another embodiment of the invention, the first node maintains a count of received communications messages for its connections. At intervals the first node will use the amount of received communication messages in a preconfigured equation such as a comparison to a value. This value can be preconfigured by the operator, it can be a value generated by a mathematical calculation based on other values or it can be in relation to other values. The comparison can be any comparison, for instance greater or less than or an average of. If using the equation, the node detects the connection is not optimal or meeting a certain criteria the first node will disconnect that connection.

In another embodiment the first node maintains a count of searches it has received from each connection. At intervals the first node will use these counts in a preconfigured equation such as a comparison to a value. This value can be preconfigured by the operator, it can be a value generated by a mathematical calculation based on other values or it can be in relation to other values. The comparison can be any comparison, for instance greater or less than or an average of If using the equation, the node detects the connection is not optimal or meeting a certain criteria the first node will disconnect that connection.

In another embodiment the first node maintains the last time the node received a communication message on a specific connection. At intervals the first node will use the last transmission time in a preconfigured equation such as a comparison to a value, which value can be preconfigured by the operator, generated by a mathematical calculation based on other values or it can be in relation to other values. The comparison can be any comparison, for example greater or less than or an average of. If using the equation, the node detects the connection is not optimal or meeting a certain criteria the first node will disconnect that connection.

In some situations it may be preferable to drop connections that are not performing as well as the average of other connections or connections that are not performing within a certain percentage of the average of other connections or against a predefined performance range. Thus, in such a case, in another embodiment, the first node would keep specific communications statistics on its connections and at intervals calculate the average of these statistics and drop those connections that are below average or drop those connections that are below some percentage of the average.

Sometimes a node can get overloaded processing communications on peer to peer networks. In this situation it would be advantageous to be able to split the load of processing communications. Accordingly, in another embodiment of the invention, multiple nodes can connect to the network at different points and share the load. These multiple nodes would maintain communications paths between themselves or to a master node and transmit and receive information about what other network nodes and where each node is connected. This would allow multiple nodes to share the load. These nodes may also report back to a master node with the searches they are processing.

When connecting many times to a network, a load is placed on the resources of the node in relation to the number of connection attempts are occurring at one time. It would be a benefit to the node if it had some way to control or throttle multiple connection attempts to the network. In this embodiment of the invention, the node is configured for a set number of concurrent connection attempts. As connections are accepted, the node will add new connection attempts to maintain this set value. Without this method, a node wishing to connect to 1,000 other nodes would attempt 1,000 concurrent connections. With the method, and configured for a maximum number of 50 concurrent connections, the node would attempt 50 concurrent connection attempts to the network. As these connection attempts succeeded or failed the node would add enough new connection attempts to reach the set limit of 50. Once the limit of 1,000 connections are established the node would not attempt any further connections.

Although limiting and controlling the concurrent number of connection attempts by the node reduces load, it is sometimes desired to initially start with a large number of concurrent connection attempts and then limit the number to a set value. In another embodiment the node is configured to attempt only a set number of concurrent connection attempts. When the connection attempts first start, the node attempts as many connections as possible until the number of successful connections reaches some value. This value can be preconfigured by the operator, generated by a mathematical calculation based on other values, or it can be in relation to other values. Once this value is reached the node will reduce its attempts to the limited concurrent connection method described above.

In many cases, a first node may connect to a second node and after some time the second node may stop transmitting without the first node knowing of such occurrence. This second node may stop transmitting because of technical problems or it may stop transmitting because it is no longer being utilized. It would be a benefit to the first node to drop the connection just as a precaution after some time has past. In one embodiment the first node is configured to keep track of when it connected to a second node. After some configured or calculated time limit is reached, the first node drops the connection and attempts to connect to either the same node again or to a different node.

As nodes connect to the network they are constantly receiving address information about other nodes to which it can be potentially connected. As these new nodes are discovered they are added to a cache. This cache is used to provide the node with potential new connections. Some nodes have a set limit on the number concurrent connections they can have. Should their set limit be reached they will not connect to any further nodes but they will continue to add any newly discovered nodes to their cache. Should a node maintain very long connections, nodes in this cache may become invalid for various reasons. When the node finally looses connections and attempts to connect to nodes in the cache, resources are consumed and wasted because the nodes are invalid. Thus, in yet another embodiment, the node is configured to add nodes to its cache as normal but also configured to clear this cache at set intervals or when the cache reaches a certain limit. By constantly clearing the cache a reduction in invalid nodes is achieved.

EXAMPLES

The following Examples illustrate various embodiments of the methods according to the present Invention.

Example 1

Figure 5:
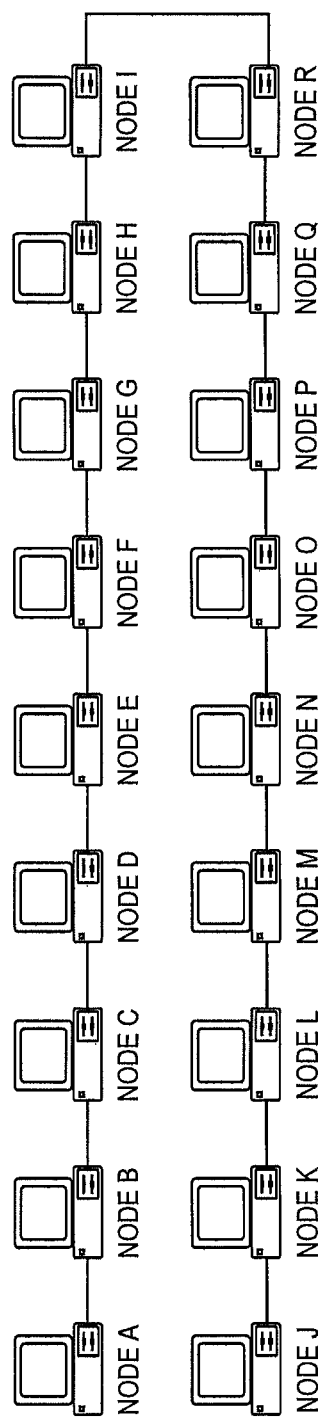
FIG. 5 is a simplified schematic of a peer to peer network consisting of more than 5 hops.

Referring to FIG. 5, this example illustrates a method for obtaining hop information from search requests and using this information to optimally connect to the network.

In this example node A is connected to node B and wishes to optimally connect into the rest of the network. The network is configured to allow communication messages to travel a maximum of 5 hops so node A is configured to look for nodes 5 hops away. Each node contains a file called "Samuel.txt." Node A sends out a search message to the network via node B with the term "Samuel.txt." Nodes A, B, C, D, E and F all respond. Node A reviews each search response and finds that node F is 5 hops away. Node A connects to node F. Node A sends out a search message to the network via node F with the term "Samuel.txt." Nodes B, C, D, E, F, G, H, I and R respond. Node A reviews each search response and finds that nodes B and R are 5 hops away. Node A knows that it is already connected to node B so it connects only to node R. Node A sends out a search message to the network via node R with the term "Samuel.txt." Nodes F, G, H, I, R, Q, P, O and N respond. Node A reviews each search response and finds that nodes F and N are 5 hops away. Node A knows that it is already connected to node F so it connects only to node N. Node A sends out a search message to the network via node N with the term "Samuel.txt." Nodes J, K, L, M, N, O, P, Q, and R respond. Node A reviews each search response and finds that nodes J and R are 5 hops away. Node A knows that it is already connected to node R so it connects only to node J. Node A sends out a search message to the network via node J with the term "Samuel.txt." Nodes J, K, L, M, and N respond. Node A reviews each search response and finds that node N is 5 hops away. Node A knows that it is already connected to node N so it does not connect. Node A is now within 5 hops of all nodes and will receive all communications from all nodes.

Example 2

Referring again to FIG. 5, example 2 illustrates a method for obtaining hop information from pings and using this information to optimally connect to the network In this example, node A is connected into node B and wishes to optimally connect into the rest of the network. The network is configured to allow communication messages to travel a maximum of 5 hops so node A is configured to look for nodes 5 hops away. Node A sends out a ping message to the network via node B. Nodes A, B, C, D, E and F all respond. Node A reviews each response and finds that node F is 5 hops away. Node A connects to node F. Node A sends out a ping to the network via node F. Nodes B, C, D, E, F, G, H, I and R respond. Node A reviews each response and finds that nodes B and R are 5 hops away. Node A knows that it is already connected to node B so it connects only to node R. Node A sends out a ping message to the network via node R. Nodes F, G, H, I, R, Q, P, O and N respond. Node A reviews each response and finds that nodes F and N are 5 hops away. Node A knows that it is already connected to node F so it connects only to node N. Node A sends out a ping message to the network via node N. Nodes J, K, L, M, N, O, P, Q, and R respond. Node A reviews each response and finds that nodes J and R are 5 hops away. Node A knows that it is already connected to node R so it connects only to node J. Node A sends out a ping message to the network via node J. Nodes J, K, L, M, and N respond. Node A reviews each response and finds that node N is 5 hops away. Node A knows that it is already connected to node N so it does not connect. Node A is now within 5 hops of all nodes and will receive all communications from all nodes.

Example 3

Referring to FIG. 5, example 3 illustrates a method for locating other nodes so that more connection options exist.

In this example Node A wishes to find other nodes to connect to. Node A is already connected to node B. The network is configured to allow communication messages to travel a maximum of 5 hops. Each node contains a file called "Samuel.txt." Node A sends out a search message to the network via node B with the term "Samuel.txt." Nodes A, B, C, D, E and F all respond. Node A reviews each search response and uses the address information contain in the message to connect to these nodes.

Example 4

Figure 2:
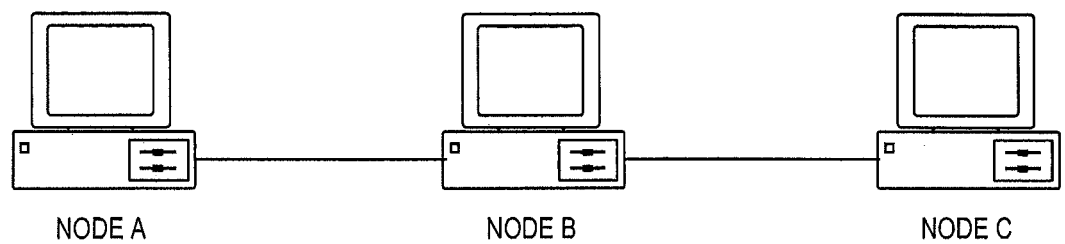
FIG. 2 is a simplified schematic of a peer to peer proxy network.

Referring to FIGS. 2 and 3, example 4 illustrates a method for optimizing a node's connections by looking at the number of duplicate messages that exist.

Referring to FIG. 3, B seeks to locate the file "Samuel.txt" and sends a search request out both of its connections to nodes A and C. Node C receives the search request. Node A receives the search request. Node A forwards the search request to node C. Node C records that it has received a duplicate message from node A. Node C finds that it has been configured to drop connections when it receives 1 duplicate message so it drops the connection to node A. Node C can still see searches from node A because they will travel through node B. Now referring to FIG. 2, the end result is that only one connection is needed to receive all communications from the network.

Example 5

Figure 4:
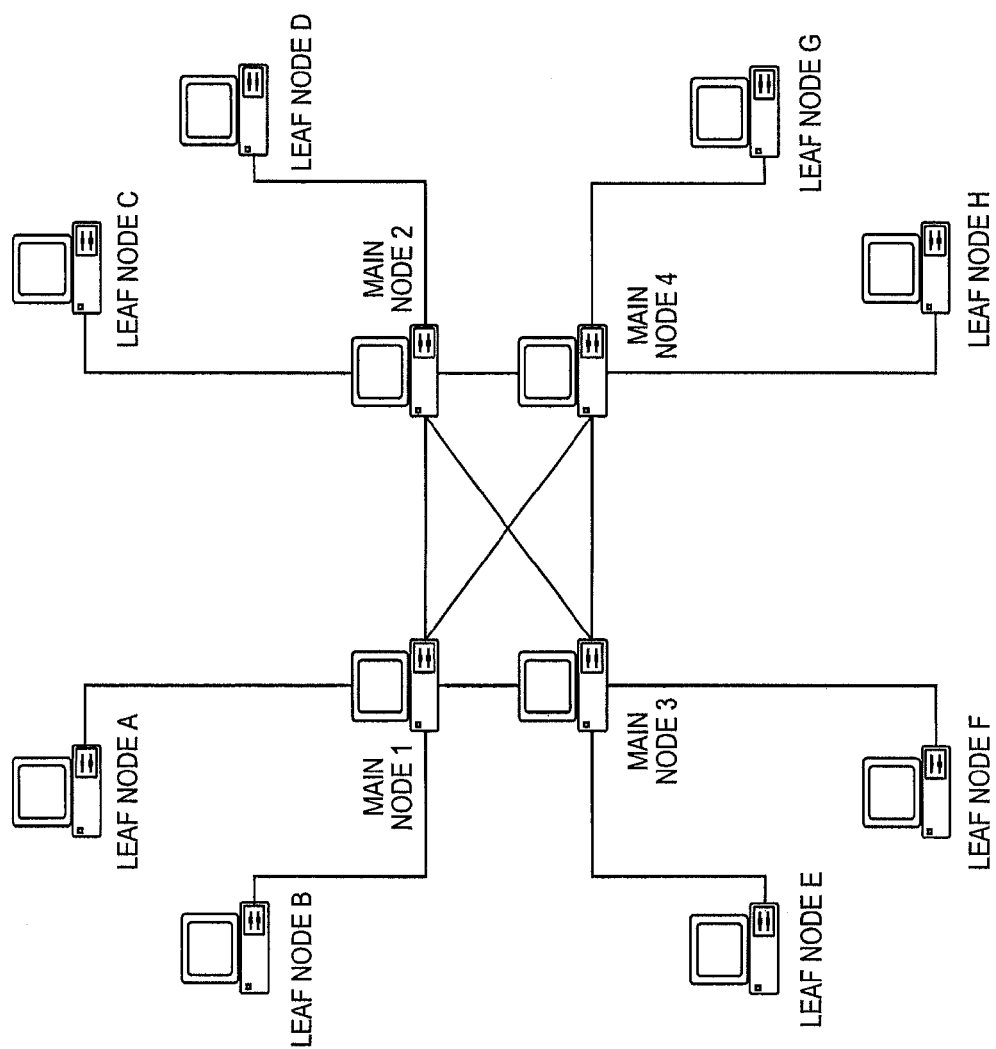
FIG. 4 is a simplified schematic of a peer to peer leaf/main node network.

Referring to FIG. 4, example 5 illustrates a method for optimizing a node's connections by monitoring the number of communication messages received on a connection.

In this example, main node 4 wishes to optimize its connections by monitoring how many communication messages it is receiving from all connections and comparing them to an average. If a connection does not meet the average it will disconnect the connection. Main node 4 records the following statistics:
   Main node 2 has sent 1 communication message
   Main node 3 has sent 1 communication message
   Leaf node G has sent 1 communication message
   Leaf node H has sent 1 communication message
   Main node 4 then waits, for example, 5 minutes, and records the following statistics:
   Main node 2 has sent 51 communication messages
   Main node 3 has sent 53 communication messages
   Leaf node G has sent 54 communication messages
   Leaf node H has sent 1 communications message
   Main node 4 adds the delta of all messages together and divides by 4 to get an average of 38.75. Because main node 4 is configured to drop any connections below the average, it will drop the connection to leaf node H.

Example 6

Referring again to FIG. 4, example 6, illustrates a method for optimizing a node's connections by monitoring the time of the last transmission received on a connection.

In this example, main node 4 is programmed to optimize its connections by monitoring when the last time its connections received a communication message and comparing them to a value. If a connection has not received any communication messages within 1 minute the node will drop the connection. Main node 4 records the following statistics:
   Main node 2 has sent 1 communication message
   Main node 3 has sent 1 communication message
   Leaf node G has sent 1 communication message
   Leaf node H has sent 1 communication message
   Main node 4 then waits 1 minute and records the following statistics:
   Main node 2 has sent 51 communication messages
   Main node 3 has sent 53 communication messages
   Leaf node G has sent 54 communication messages
   Leaf node H has sent 1 communications message
   Because main node 4 is configured to drop any connections that have not received any communication messages within 1 minute it will drop the connection to leaf node H.

Example 7

Referring to FIG. 4 again, example 7 illustrates a method for optimizing a node's connections by monitoring the number of search requests received on its connections.

In this example, main node 4 is programmed to optimize its connections by monitoring how many search requests it is receiving from all connections and comparing them to an average. If a connection does not meet the average it will disconnect the connection. Main node 4 records the following statistics;
   Main node 2 has sent 1 search request
   Main node 3 has sent 1 search request
   Leaf node G has sent 1 search request
   Leaf node H has sent 1 search request
   Main node 4 then waits, 5 minutes and records the following statistics:
   Main node 2 has sent 51 search request
   Main node 3 has sent 53 search request
   Leaf node G has sent 54 search request
   Leaf node H has sent 1 search request
   Main node 4 adds the delta of all messages together and divides by 4 to get an average of 38.75. Because main node 4 is configured to drop any connections below the average, it will drop the connection to leaf node H.

Example 8

Figure 6:
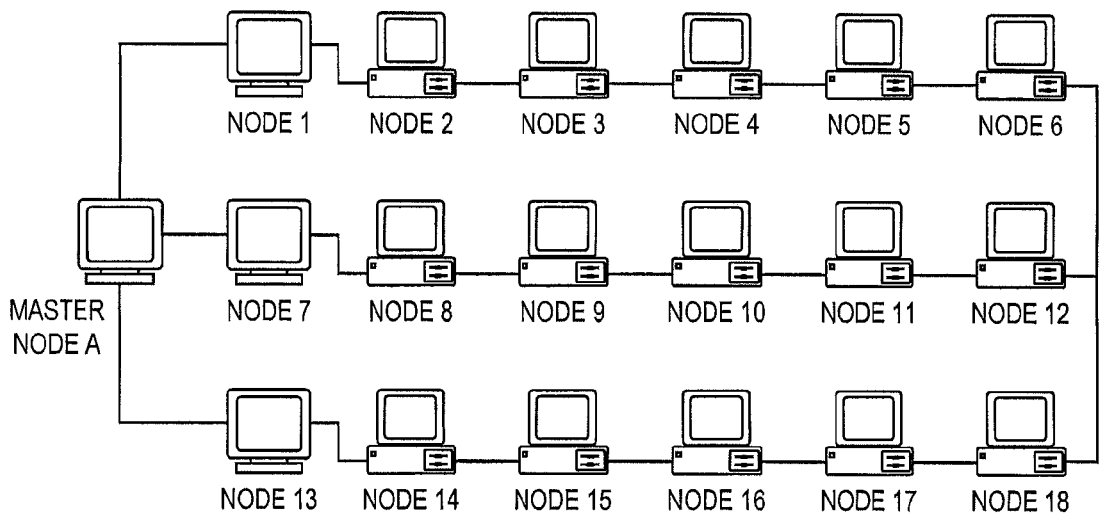
FIG. 6 is a simplified schematic of a peer to peer network with nodes sharing the load.

Referring to FIG. 6, example 8 illustrates a method for splitting the load among multiple nodes and reporting the information to a master node. The master node also keeps track of which network nodes the load sharing nodes are connected to.

Here, Nodes 1, 7 and 13 are depicted as sharing the load of monitoring a network at optimal points. Node 1 is connected to node 2 and reports this information to master node A. Node 7 is connected to node 8 and reports this information to master node A. Node 13 is connected to node 14 and reports this information to master node A. Node 7 wishes to connect to node 2 and sends this request to master node A. Master node A knows that node 1 is connected to node 2 and denies the request.

Node 2 issues a search request for "samuel.txt." Node 1 receives this communications message and forwards it to master node A. Master node A records the information. Node 17 issues a search request for "bob.txt." Node 13 receives this communication message and forwards it to master node A. Master node A records this information.

Example 9

Figure 7:
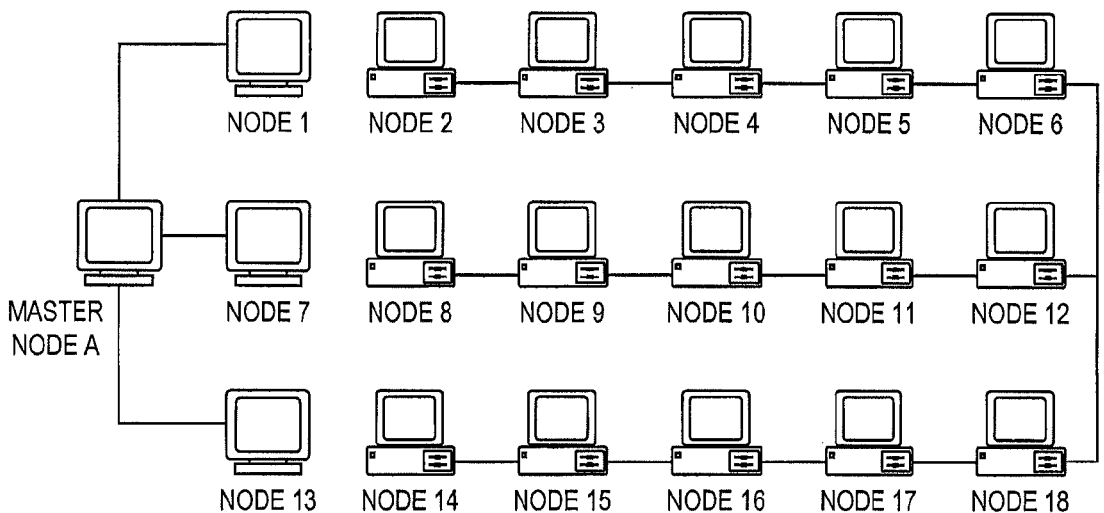
FIG. 7 is a simplified schematic of a peer to peer network with nodes sharing the load but not yet connected.

Referring to FIGS. 6 and 7, example 9 illustrates a method for splitting the load among multiple nodes and reporting the information to a master node. The master node also informs the load sharings nodes which network nodes to connect to.

Referring first to FIG. 7, in this example Nodes 1, 7 and 13 wish to join the network. Nodes 1, 7 and 13 send communication messages to master node A requesting clients to connect to. Master node A replies to node 1 with connection information for node 2. Master node A replies to node 7 with connection information for node 8. Master node A replies to node 13 with connection information for node 14.

Nodes 1, 7 and 13 connect and are sharing the load of monitoring a network at optimal points. Node 1 is connected to node 2 and reports this information to master node A. Node 7 is connected to node 8 and reports this information to master node a. Node 13 is connected to node 14 and reports this information to master node A. Node 7 wishes to connect to node 2 and sends this request to master node A. Master node A knows that node 1 is connected to node 2 and denies the request.

Node 2 issues a search request for "samuel.txt." Node 1 receives this communications message and forwards it to master node A. Master node A records the information. Node 17 issues a search request for "bob.txt." Node 13 receives this communication message and forwards it to master node A. Master node A records this information.

Example 10

Figure 8:
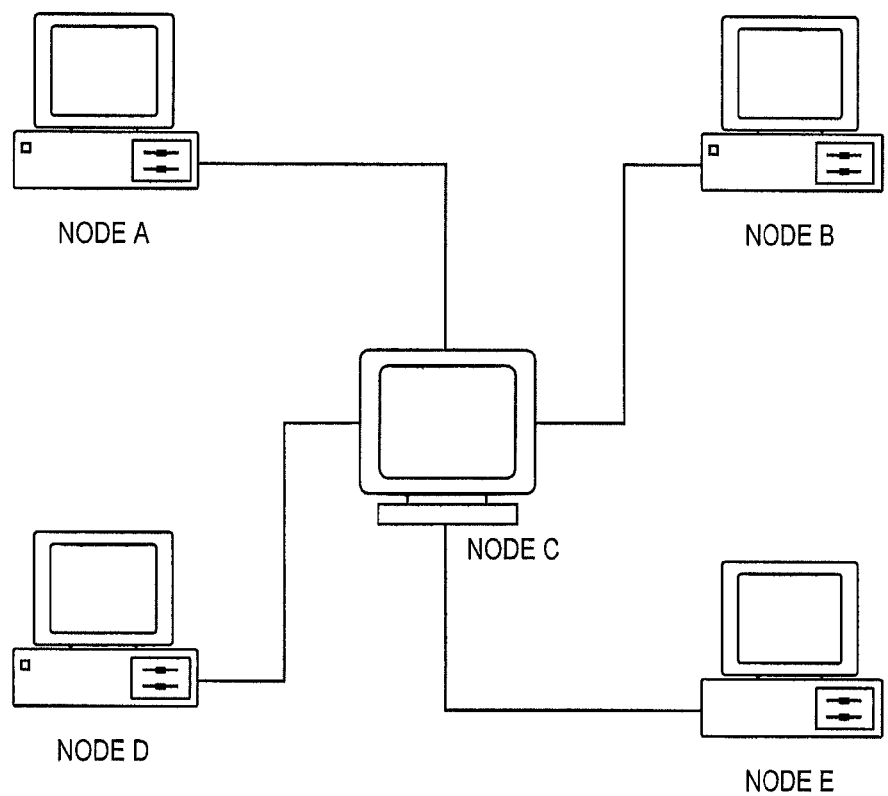
FIG. 8 is a simplified schematic of a peer to network with a node throttling its connections.

Referring to FIG. 8, example 10 illustrates a method for throttling connection attempts to a network.

In this example node C wishes to connect to a maximum of four other nodes. In its cache it has the following entries:
Node A
Node H
Node L
Node V
Node B
Node O
Node E
Node D Node C is configured to only have a maximum of 2 concurrent connection attempts and to wait 10 seconds for each connection attempt. Node C attempts to connect to node A and node H. Node C connects to node A and establishes a connection. Node C continues to wait for the connection attempt to node H. Because Node C connected to node A, there is now one empty connection slot so node C attempts to connect to Node V. The connection attempt to node H fails so there is now one empty connection slot. Node C attempts to connect to node B and this connection attempt succeeds. Because once again there is one empty connection slot node C attempts to connect to node O. An error occurs immediately and at the same time the connection attempt to node V fails as well. There are now two empty connection slots available. Node C attempts to connect to node E and node D. Node C's connection attempt with node D is successful. After 10 seconds, the connection attempt to node E fails.

While presently preferred embodiments have been described and depicted, the invention may be otherwise embodied within the scope of the following claims:

While this invention has been particularly shown and described with references to example embodiments thereof, it will be understood by those skilled in the art that various changes in form and details may be made therein without departing from the scope of the invention encompassed by the appended claims.

What is claimed is:

1. A method for utilizing a peer to peer network having a plurality of nodes that exchange electronic messages over the peer to peer network, the method comprising:
   a. defining a maximum concurrent connection value;
   b. attempting through a first node, multiple connections to nodes in the peer to peer network up to the maximum concurrent connection value;
   c. adding new connection attempts up to the concurrent connection value as connection attempts succeed or fail;
   d. dropping a particular connection if a particular node receives less than a threshold number of messages on the particular connection during a predetermined amount of time; and
   e. dropping the particular connection if the particular node receives a number of duplicate messages.

2. The method as set forth in claim 1 wherein the first node attempts more than the maximum concurrent connection value until a defined number of successful connection attempts.

3. The method as set forth in claim 1 wherein the first node waits a threshold amount of time for each connection attempt.

4. A node in a peer to peer network having a plurality of nodes that exchange electronic messages over the peer to peer network, the node comprising:
   one or more interfaces configured to exchange the electronic messages with other nodes over the peer to peer network utilizing logic, wherein the logic is configured to:
      attempt multiple connections to other nodes in the peer to peer network up to a maximum concurrent connection value that the node is allowed to have in the peer to peer network;
      add new connection attempts up to the concurrent value as connection attempts succeed or fail;
      drop a particular connection if less than a threshold number of messages are received on the particular connection during a predetermined amount of time; and
      drop the particular connection if a number of duplicate messages are received.

5. The node as set forth in claim 4 further configured to attempts more than the maximum concurrent connection value until a defined number of successful connection attempts.

6. The node as set forth in claim 4 further configured to wait a threshold amount of time for each connection attempt.

7. The method as set forth in claim 1 wherein messages received by the particular node over the particular connection are search requests.

8. The method as set forth in claim 1 wherein a particular node receives less than a threshold number of messages on the particular connection within a predetermined amount of time, further comprises:
   determining a first number of messages received by the particular node over the particular connection;
   waiting the predetermined amount of time to elapse;

determining a second number of messages received by the particular node over the particular connection;

determining a difference between the first number of message and the second number of messages; and dropping the particular connection if the difference between the first number of messages and the second number of messages is less than the threshold number of messages.

9. The method as set forth in claim 8 wherein the threshold number of messages is an average number of messages received on all connections associated with the particular node.

10. The node as set forth in claim 4 wherein messages received by the particular node over the particular connection are search requests.

11. The method as set forth in claim 1 further comprising: maintaining a cache that includes information associated with newly discovered nodes in the peer to peer network.

12. The method as set forth in claim 11 further comprising: connecting, by the particular node, to a new node utilizing the information in the cache in response to the particular node dropping the particular connection.

13. The method as set forth in claim 11 further comprising: clearing the cache when the cache reaches a limit.

14. The method as set forth in claim 11 further comprising: clearing the cache at set intervals.

15. The method as set forth in claim 1 wherein dropping the particular connection if the particular node receives a number of duplicate messages, further comprises:

maintain, by the particular node, a count of the duplicate messages received from a different node over the particular connection during a selected time period; and dropping the particular connection if the count of duplicate messages maintained by the particular node exceeds a duplicate message threshold.

* * * * *

UNITED STATES PATENT AND TRADEMARK OFFICE
CERTIFICATE OF CORRECTION

| | | |
|---|---|---|
| PATENT NO. | : 8,904,015 B2 | Page 1 of 1 |
| APPLICATION NO. | : 13/429949 | |
| DATED | : December 2, 2014 | |
| INVENTOR(S) | : Samuel P. Hopkins | |

It is certified that error appears in the above-identified patent and that said Letters Patent is hereby corrected as shown below:

In the Specification:

Col. 1, line 42 should read:
Node B will then forward Node A's request to node C and Node Col. 4, line 39 should read:
son, for instance greater or less than or an average of. If using In the Claims:

Claim 4, Col. 10, line 38 should read:
one or more hardware interfaces configured to exchange the elec- Signed and Sealed this
Seventeenth Day of March, 2015

Michelle K. Lee
*Director of the United States Patent and Trademark Office*